US012607878B2

(12) United States Patent
Yan et al.

(10) Patent No.: US 12,607,878 B2
(45) Date of Patent: Apr. 21, 2026

(54) MYOPIA PREVENTION AND CONTROL SPECTACLE LENS

(71) Applicant: Jiangsu Conant Optical Co., Ltd,
Qidong City (CN)

(72) Inventors: Qingbo Yan, Nantong (CN); Chuanbao Wang, Nantong (CN)

(73) Assignee: Jiangsu Conant Optical Co., Ltd,
Nantong (CN)

( * ) Notice: Subject to any disclaimer, the term of this patent is extended or adjusted under 35 U.S.C. 154(b) by 241 days.

(21) Appl. No.: 18/495,681

(22) Filed: Oct. 26, 2023

(65) Prior Publication Data

US 2025/0028190 A1 Jan. 23, 2025

(30) Foreign Application Priority Data

Jul. 21, 2023 (CN) .......................... 202310901998.1

(51) Int. Cl.
*G02C 7/06* (2006.01)

(52) U.S. Cl.
CPC ........... *G02C 7/06* (2013.01); *G02C 2202/24* (2013.01)

(58) Field of Classification Search
CPC .............................. G02C 7/06; G02C 2202/24
USPC ..................................................... 351/159.42
See application file for complete search history.

(56) References Cited

U.S. PATENT DOCUMENTS

| | | | | |
|---|---|---|---|---|
| 10,877,294 | B2 * | 12/2020 | Lau ........................... | G02C 7/06 |
| 2017/0131567 | A1 * | 5/2017 | To .............................. | G02C 7/06 |
| 2021/0048690 | A1 * | 2/2021 | Guillot ................... | G02C 7/086 |
| 2025/0035955 | A1 * | 1/2025 | Guillot ..................... | G02C 7/06 |

FOREIGN PATENT DOCUMENTS

| | | | | | |
|---|---|---|---|---|---|
| EP | | 4030221 A2 * | 7/2022 | ............... | G02C 7/06 |
| WO | WO-2020113212 A1 * | | 6/2020 | ............. | G02C 7/022 |

* cited by examiner

*Primary Examiner* — Sharrief I Broome

(57) ABSTRACT

Disclosed is a myopia prevention and control spectacle lens, including a lens body, wherein the lens body is provided with four regions including a first region for providing refractive power, a second region for inhibiting myopia development, and a third region and a fourth region for providing a progressive diopter variation. The first region has a function of focusing an image on a retina of an eye while correcting a refractive error. The second region has a function of restricting image focusing. The third region has a function of expanding a visual field. For distant vision identification, an image of an object is formed through the first region while imaging in front of or behind the retina is restricted through the second region. For near vision, through the third region, the vision is clearer, and the development of a refractive error of an eyeball can be inhibited or slowed down.

5 Claims, 2 Drawing Sheets

MYOPIA PREVENTION AND CONTROL SPECTACLE LENS

CROSS-REFERENCE TO RELATED APPLICATIONS

This application claims priority of Chinese Patent Application No. 202310901998.1, filed on Jul. 21, 2023, the entire contents of which are incorporated herein by reference.

TECHNICAL FIELD

The present disclosure relates to the technical field of lenses, and particularly to a myopia prevention and control spectacle lens.

BACKGROUND

The characteristic of ocular myopia is that an eye focuses a distant object in front of a retina of the eye, and the characteristic of ocular hyperopia is that an eye focuses a distant object behind a retina of the eye. Concave lenses are usually used to correct myopia, and convex lenses are usually used to correct hyperopia. When conventional single-vision optical lenses are used to correct the myopia, a central part of an image is transmitted onto the retina, while its peripheral part is transmitted behind the retina, thereby inducing an eyeball to grow towards a position behind the retina, in which case an axial length of the eye increases and a refractive state of the eye develops to a state of aggravated myopia. When the conventional single-vision optical lenses are used to correct hyperopia, the central part of the image is transmitted onto the retina, while its peripheral part is transmitted to the front of the retina, thereby inducing the eyeball to grow towards a position in front of the retina, in which case the axial length of the eye decreases and the refractive state of the eye develops to a state of aggravated hyperopia.

Defects in the Existing Technology:

Currently, upon patent search, it is found that for vision protection and control spectacle lenses, foreign patents include lenses described in Japanese Patent No. 44891249, which are concentric Fresnel multifocal lenses, and Chinese patents include CN104678572B and CN11390809A, etc. These patents generally correct a refractive error through a first region, and add positive or negative refractive power to the first region through a second region to transmit the peripheral part of the image to the front or rear of the retina, thereby achieving the function of inhibiting or at least slowing down the development of myopia or hyperopia. The lenses mentioned above cannot achieve sufficiently clear vision of a near object, thereby causing inconvenience and being adverse to the promotion and popularization of the vision protection and control lenses.

SUMMARY

The present disclosure aims to provide a myopia prevention and control spectacle lens to solve the problem as proposed in the above Background.

To achieve the above objective, the present disclosure provides the following technical solution: a myopia prevention and control spectacle lens includes a lens body, wherein the lens body is provided with four regions, the four regions including a first region for providing refractive power, a second region for inhibiting myopia development, and a third region and a fourth region for providing a progressive diopter variation.

In an embodiment, the first region is configured as a centrosymmetric refractive region of the lens body, and the first region is disposed on a front surface or a rear surface of the lens body.

In an embodiment, the second region is provided with several pits arranged dispersedly as an out-of-focus region, and the second region is disposed on the front surface of the lens body.

In an embodiment, the third region is configured as a near vision region, the third region is configured as a refractive region with a progressive diopter variation, and the third region is disposed on the front surface or the rear surface of the lens body.

In an embodiment, a diameter of the first region ranges from 5.5 mm to 20 mm, and a shape of the first region is configured to be a circular shape, a shell shape, a triangular shape, a square shape, or a regularly hexagonal shape, etc.

In an embodiment, the second region is configured to half-surround the first region, and a shape of the second region is configured to be an incomplete circular shape, a square shape, or a regularly hexagonal shape, etc.

In an embodiment, a diameter of each of the pits in the second region ranges from 0.1 mm to 2.4 mm, and a spacing between adjacent ones of the pits in the second region is 0.3-2.8 mm.

In an embodiment, an additional diopter range of the third region is configured to be +0.25 to +4.00.

In an embodiment, the fourth region is an edge region of the lens body.

In an embodiment, the first region, the second region, and the third region are configured to be translatable in any direction within the lens body.

Compared with the existing technology, the present disclosure has the following beneficial effects:

The myopia prevention and control spectacle lens is provided with the first region for providing the refractive power, the second region for inhibiting the myopia development, and the third region and the fourth region for providing the progressive diopter variation. The first region has a function of focusing an image on a retina of an eye while correcting a refractive error. The second region has a function of restricting image focusing. The third region has a function of expanding a visual field to render a vision clearer. For distant vision identification, an image of an object is formed through the first region while imaging in front of or behind the retina is restricted through the second region, so as to inhibit or at least slow down the development of myopia and hyperopia. For near vision, through the third region, the vision is clearer, and the development of a refractive error of an eyeball can be inhibited or at least slowed down.

Figure 1:
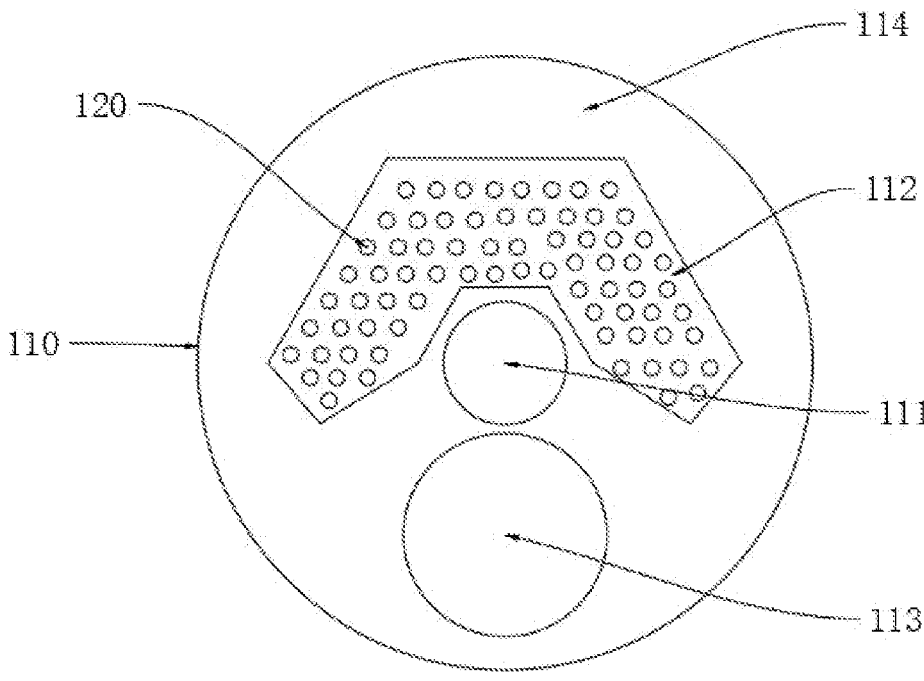
FIG. 1 is an overall schematic diagram of the present disclosure.

In the drawings: 110. lens body; 111. first region; 112. second region; 113. third region; 114. fourth region; and 120. pit.

DETAILED DESCRIPTION

The technical solution in embodiments of the present disclosure will be clearly and completely described below in conjunction with the drawings in the embodiments of the present disclosure. Apparently, the described embodiments are only part, but not all, of the embodiments of the present disclosure. Based on the embodiments in the present disclosure, all other embodiments obtained by those of ordinary skills in the art without the exercise of inventive effort fall within the scope of protection of the present disclosure.

In the description of the present disclosure, it should be understood that the terms "central", "longitudinal", "transverse", "length", "width", "thickness", "upper", "lower", "top", "bottom", "inner", "outer", "clockwise", "counter-clockwise", etc. refer to orientations or positional relationships which are based on the orientations or positional relationships shown in the drawings. These terms are intended only to facilitate description of the present disclosure and simplify the description, rather than indicating or implying that devices or elements referred to necessarily have particular orientations, are constructed and operated in particular orientations, and therefore cannot be understood as limitations on the present disclosure.

In the description of the present disclosure, it is to be noted that, unless otherwise specified and defined, the terms "installation", "connection", and "disposing" should be understood in a broad sense. For example, these terms may be understood as fixed connection and disposing, detachable connection and disposing, or integrated connection and disposing. For a person of ordinary skills in the art, the particular meanings of the above terms in the present disclosure may be understood based on particular situations.

In addition, the terms "first" and "second" are used only for description and cannot be understood as indicating or implying relative importance or implying the number of technical features indicated. Therefore, features defined by "first" and "second" can explicitly or implicitly include one or more of these features. In the description of the present disclosure, the meaning of "several" refers to two or more, unless otherwise clearly defined.

Embodiment

Figure 2:
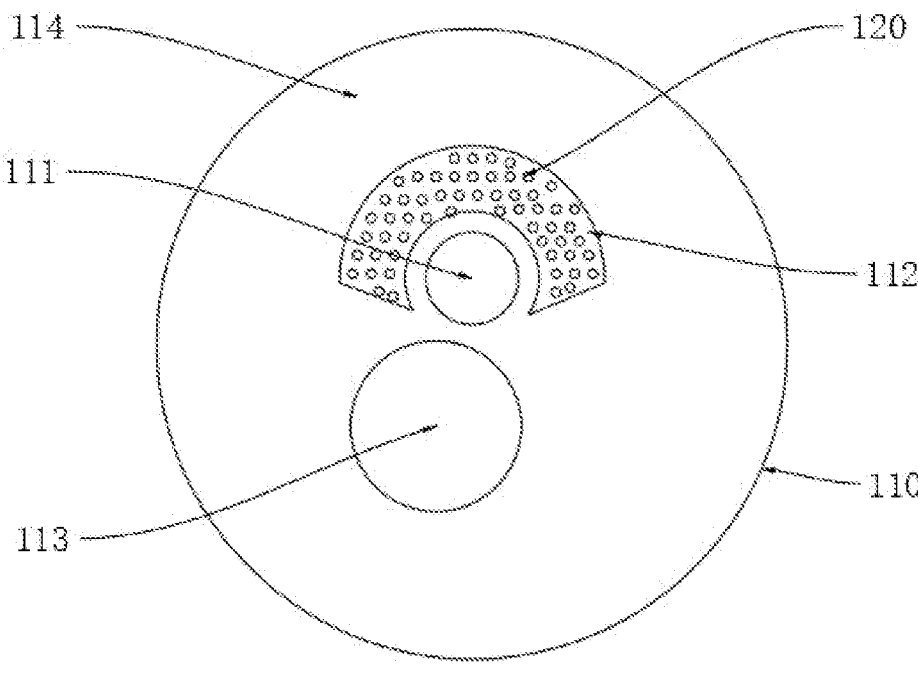
FIG. 2 is another overall schematic diagram of the present disclosure.
Figure 3:
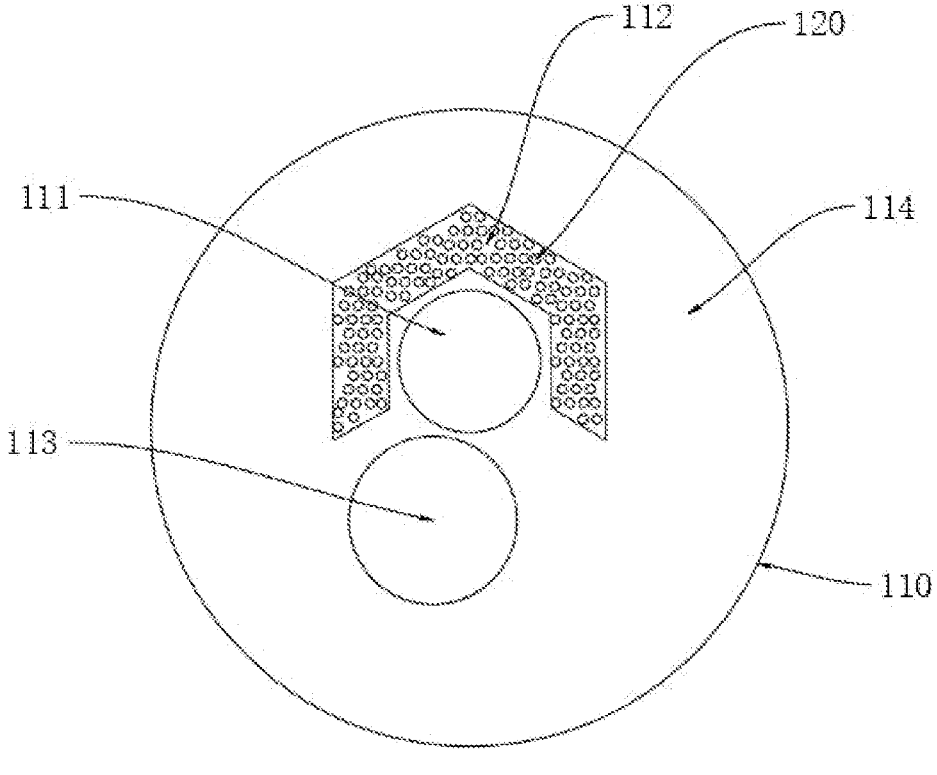
FIG. 3 is yet another overall schematic diagram of the present disclosure.

Referring to FIGS. 1-3, the present disclosure provides a technical solution of a myopia prevention and control spectacle lens, including a lens body 110, wherein the lens body 110 is provided with four regions, the four regions including a first region 111 for providing refractive power, a second region 112 for inhibiting myopia development, and a third region 113 and a fourth region 114 for providing a progressive diopter variation. The first region 111 is configured as a centrosymmetric refractive region of the lens body 110 and is formed as a regular region with refractive power having a function of correcting myopia. The first region 111 is disposed on a front surface or a rear surface of the lens body 110. The second region 112 contains several pits 120 arranged dispersedly as an out-of-focus region, which can reduce a contrast of retinal imaging and inhibit the development of ocular myopia. The second region 112 is disposed on the front surface of the lens body 110. The third region 113 is configured as a near vision region, and the third region 113 is a refractive region with a progressive diopter variation, which renders a vision clearer and a visual field wider while inhibiting or reducing the development of a refractive error of an eyeball. The third region 113 is disposed on the front surface or the rear surface of the lens body 110. A refractive design with the progressive diopter variation in the third region 113 may be either an inner progressive design, or other designs, such as an outer progressive design, that can add additional diopters to the lens body 110. The fourth region 114 is an edge region of the lens body 110. The first region 111, the second region 112, and the third region 113 are translatable in any direction within the lens body 110. The first region 111 has a function of focusing an image on a retina of an eye while correcting the refractive error. The second region 112 has a function of restricting image focusing. The third region 113 has a function of expanding the visual field to render the vision clearer. For distant vision identification, an image of an object is formed through the first region 111 while imaging in front of or behind the retina is restricted through the second region 112, so as to inhibit or at least slow down the development of myopia and hyperopia. For near vision, through the third region 113, the vision is clearer, and the development of the refractive error of the eyeball can be inhibited or at least slowed down. Further, a diameter of the first region 111 ranges from 5.5 mm to 20 mm, and a shape of the first region 111 is configured to be a circular shape, a shell shape, a triangular shape, a square shape, or a regularly hexagonal shape, etc. The second region 112 is configured to half-surround the first region 111, and a shape of the second region 112 is configured to be an incomplete circular shape, a square shape, or a regularly hexagonal shape, etc. A diameter of each of the pits 120 in the second region 112 ranges from 0.1 mm to 2.4 mm, and a spacing between adjacent ones of the pits 120 in the second region 112 is 0.3-2.8 mm. An additional diopter range of the third region 113 is configured to be +0.25 to +4.00.

A working principle of the present disclosure is as follows:

In use, the myopia prevention and control spectacle lens of this embodiment is provided with the first region 111 for providing the refractive power, the second region 112 for inhibiting the myopia development, and the third region 113 and the fourth region 114 for providing the progressive diopter variation. The first region 111 has a function of focusing an image on a retina of an eye while correcting a refractive error. The second region 112 has a function of restricting image focusing. The third region 113 has a function of expanding a visual field to render a vision clearer. For distant vision identification, an image of an object is formed through the first region 111 while imaging in front of or behind the retina is restricted through the second region 112, so as to inhibit or at least slow down the development of myopia and hyperopia. For near vision, through the third region 113, the vision is clearer, and the development of a refractive error of an eyeball may be inhibited or at least slowed down.

The basic principle, main features, and advantages of the present disclosure are shown and described above. Technicians in this industry should understand that the present disclosure is not limited by the above embodiments. The above embodiments and descriptions in the specification are only preferable examples of the present disclosure and are not intended to limit the present disclosure. Without departing from the spirit and scope of the present disclosure, there may be various variations and improvements to the present disclosure, which all fall within the claimed scope of the present disclosure. The scope as claimed in the present disclosure is defined by the claims and equivalents thereof.

The invention claimed is:

1. A myopia prevention and control spectacle lens, comprising a lens body (110), wherein the lens body (110) is provided with four regions, the four regions comprising a first region (111) for providing refractive power, a second region (112) for inhibiting myopia development, and a third region (113) and a fourth region (114) for providing a progressive diopter variation;

wherein the second region (112) is provided with several pits (120) arranged dispersedly as an out-of-focus region, and the second region (112) is disposed on a front surface of the lens body (110);

wherein the third region (113) is configured as a near vision region, the third region (113) is configured as a refractive region with a progressive diopter variation, and the third region (113) is disposed on a front surface or a rear surface of the lens body (110);

wherein a diameter of the first region (111) ranges from 5.5 mm to 20 mm, and a shape of the first region (111) is configured to be a circular shape, a shell shape, a triangular shape, a square shape, or a regularly hexagonal shape;

wherein a diameter of each of the pits (120) in the second region (112) ranges from 0.1 mm to 2.4 mm, and a spacing between adjacent ones of the pits (120) in the second region (112) is 0.3-2.8 mm;

wherein the third region (113) and the fourth region (114) are located at a periphery of the first region (111) and the second region (112).

2. The myopia prevention and control spectacle lens of claim 1, wherein the first region (111) is configured as a centrosymmetric refractive region of the lens body (110), and the first region (111) is disposed on a front surface or a rear surface of the lens body (110).

3. The myopia prevention and control spectacle lens of claim 1, wherein the second region (112) is configured to half-surround the first region (111), and a shape of the second region (112) is configured to be an incomplete circular shape, a square shape, or a regularly hexagonal shape, etc.

4. The myopia prevention and control spectacle lens of claim 1, wherein an additional diopter range of the third region (113) is configured to be +0.25 to +4.00.

5. The myopia prevention and control spectacle lens of claim 1, wherein the fourth region (114) is an edge region of the lens body (110).

* * * * *